F. Nishwitz.
Harvester.
No. 73,827. Patented Jan. 28, 1868.
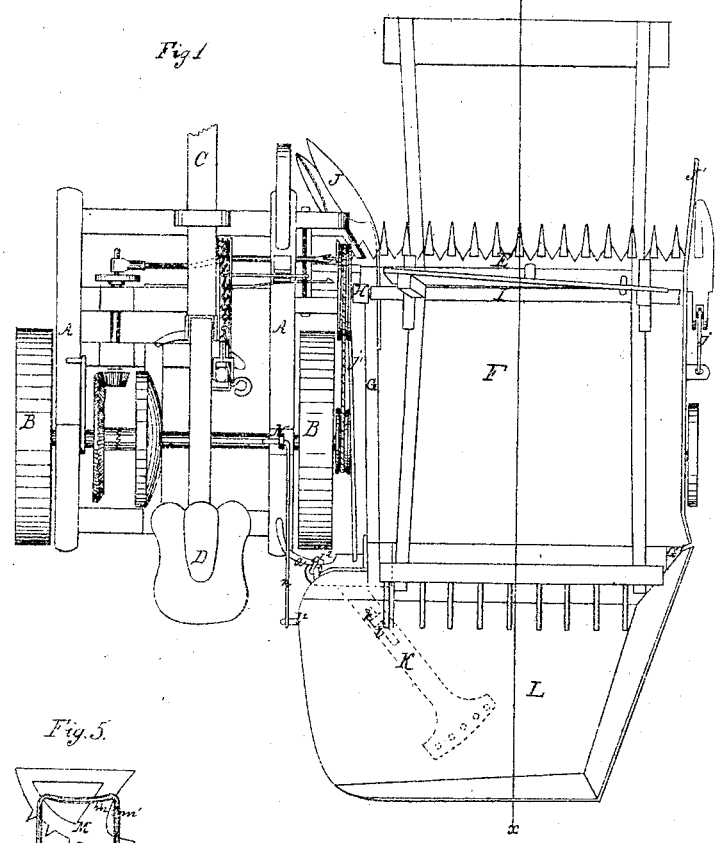
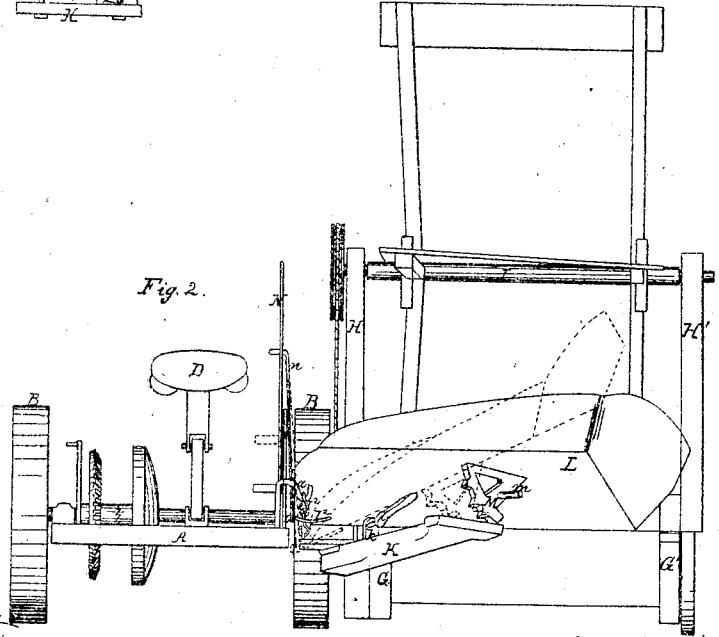
Witnesses.
Inventor

F. Nishwitz.
Harvester.
№ 73827
Patented Jan. 28, 1868.
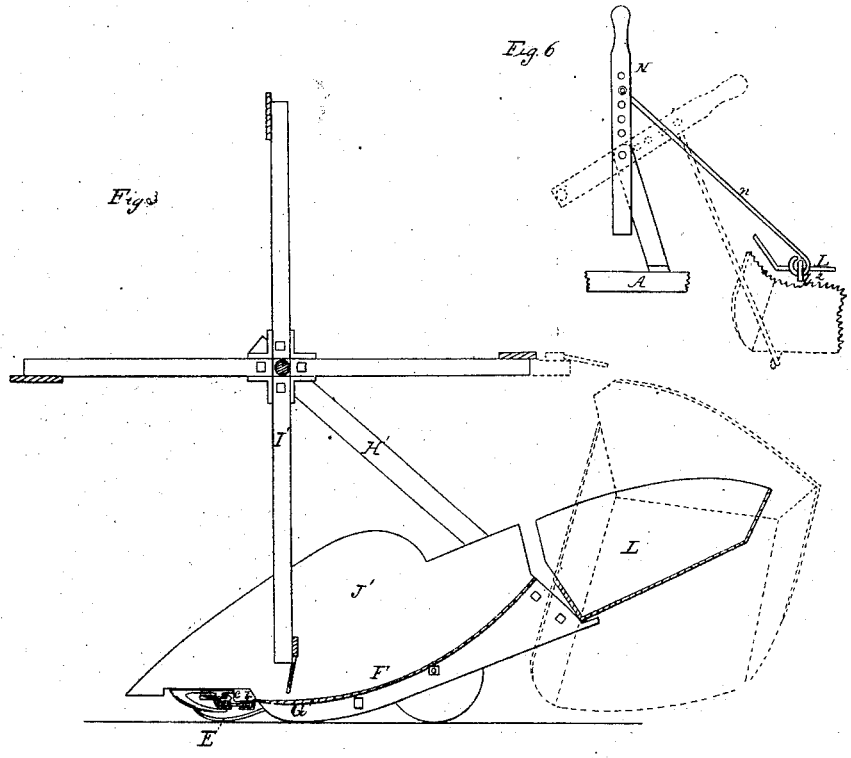
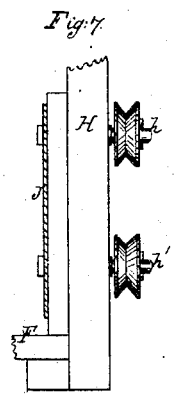
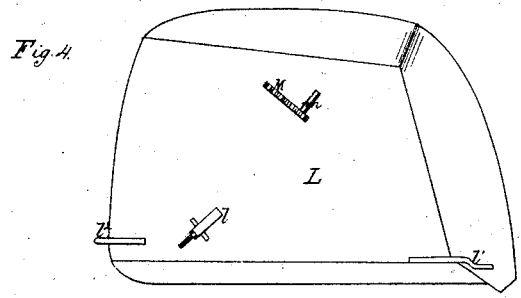
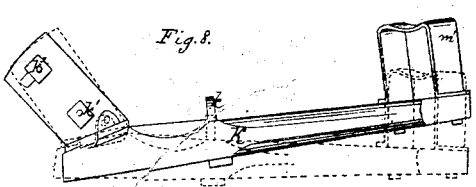

United States Patent Office.

FREDERICK NISHWITZ, OF BROOKLYN, NEW YORK

*Letters Patent No. 73,827, dated January 28, 1868.*

---

IMPROVEMENT IN HARVESTERS.

---

The Schedule referred to in these Letters Patent and making part of the same.

---

TO ALL WHOM IT MAY CONCERN:

Be it known that I, FREDERICK NISHWITZ, of Brooklyn, in the county of Kings, and State of New York, have invented certain new and useful Improvements in Harvesters, of which the following is a full, clear, and exact description, reference being had to the accompanying drawings, which make part of this specification, and in which—

Figure 1 represents a plan or top view of a harvester embracing my improvements, the detachable frame and connections being shown in blue lines.

Figure 2 is view, in elevation, of the same, as seen from the rear, the red lines showing the dumping-box partially tilted to discharge the gavel.

Figure 3 is a vertical longitudinal section through the line $x\ x$ of fig. 1, the position of the dumping-box when tilted being shown in red lines.

Figure 4 is a view of the under side of the dumping-box.

Figure 5 is a view in detail of the rolling fulcrum of the dumping-box, with its supporting-arm and guide.

Figure 6 is a view showing in detail the apparatus for tilting the dumping-box, the red lines showing the relative positions of the respective parts when tilted.

Figure 7 is a view of the inner post and reel-pulleys, and

Figure 8 is a view showing the mode of adjusting the supporting-arm, which carries the dumping-box, in order to vary the inclination of the latter.

It is the object of the invention herein claimed to readily convert a mowing-machine into an automatic or self-raking reaper, or *vice versa;* and to this end my improvement consists in combining, in an independent or detachable frame, a concave platform, a reel-rake, reel-supports, and a tilting dumping-box, so that they can be bodily applied to or removed from a mowing-machine, substantially as hereinafter described.

In the accompanying drawings, which exemplify one convenient mode of carrying out the objects of my invention, my improvement is shown as applied to a two-wheeled, side-draught, front-cut mowing-machine, known as the "Monitor Mower," and described in Letters Patent of the United States, numbered 46,488, granted to me, February 21, 1865, for improvement in harvesters.

In this instance, the main frame A is supported upon two main wheels B, which drive the cutters through proper gearing. A tongue, C, projects from the front of the frame, and a driver's seat, D, is mounted upon the rear of the frame. A finger-beam, E, is hinged to the main frame in such manner as to permit it freely to conform to the undulations of the ground over which it is drawn. A platform, F, is attached to a frame, consisting of two side pieces G G', upon which, in this instance, the reel-posts or standards H H', carrying a reel, I, are mounted; the inner post H being mounted on the front of the frame, while the one on the grain-side is mounted upon the rear of the frame. This reel, I construct in the usual form, except that I make the arms longer than they ordinarily are, so that they may reach forward into leaning grain; and I also suspend it proportionately higher above the platform. A small grain-wheel supports the divider-end of the platform. The platform is provided with suitable dividers and grain-guards J J' at each end. An arm, K, attached to and projecting diagonally behind this frame, supports a tilting dumping-box or platform, L. The platform and frame can readily be attached to or removed from the machine, being provided, for that purpose, with bifurcated lugs $b$, (fig. 3,) which slip on the finger-beam, and hold the frame securely. A hook and staple, $j$, or other suitable fastening, holds the divider-side of the frame secure, while the gearing-side is secured by a link-rod, $j^1$, which is attached to the finger-beam in front, and hooks into the arm K, in the rear, (see fig. 1.) The inner rear corner of the platform-frame is sustained by a chain, $j^2$, hooked into a standard, $a$, on the inner rear corner of the main frame. The dumping-box extends across the whole width of the platform, and extends somewhat beyond it on the gearing-side; it is tilted by means of a link, $n$, pivoted at one end to a hook, $l^2$, or other suitable connection, on its inner front corner, and at its other end to a rocking-lever, N, pivoted upon the frame, and so constructed as to be operated either by the hand or foot of the driver, (see fig. 6.) The reel is driven by a band, encircling a pulley on the main axle, and passing over pulleys $h\ h'$ on the reel-post before encircling the pulley on the reel-shaft.

What I claim as my invention, and desire to secure by Letters Patent, is—

The combination, in the manner described, of the concave platform, the reel-rake, the reel-supports, and the tilting dumping-box, in an independent frame, so that they can be bodily attached to or removed from the machine.

In testimony whereof, I have hereunto subscribed my name.

F. NISHWITZ.

Witnesses:
 HENRY A. LEE,
 C. H. TIEBOUT.